United States Patent [19]

Maudsley

[11] Patent Number: 5,085,061
[45] Date of Patent: Feb. 4, 1992

[54] ANTI-THEFT DEVICE FOR MOTOR VEHICLES

[76] Inventor: Michael J. Maudsley, 6 Trevor Place, La Lucia, Durban, Natal Province, South Africa

[21] Appl. No.: 576,960

[22] Filed: Sep. 4, 1990

[30] Foreign Application Priority Data

Sep. 1, 1989 [ZA] South Africa ............. 89/6730

[51] Int. Cl.⁵ ............................................ B60R 25/00
[52] U.S. Cl. ................................... 70/225; 70/253; 70/257; 70/279
[58] Field of Search ............. 70/255, 253, 256, 257, 70/279, 225–227

[56] References Cited

U.S. PATENT DOCUMENTS

| | | | |
|---|---|---|---|
| 1,343,731 | 6/1920 | Kyle | 70/226 |
| 1,441,826 | 1/1923 | Bireley et al. | 70/227 |
| 2,126,946 | 8/1938 | Burt | 70/253 |
| 3,669,211 | 6/1972 | Gilgoff | 70/257 X |
| 4,034,824 | 7/1977 | Lucas | 70/226 X |
| 4,135,377 | 1/1979 | Kleefeldt et al. | 70/279 X |
| 4,622,833 | 11/1986 | Shenherd | 70/226 |
| 4,669,767 | 6/1987 | Leto | 70/DIG. 65 X |
| 4,683,737 | 8/1987 | Armstrong | 70/256 X |
| 4,688,036 | 8/1987 | Hirano et al. | 70/257 X |
| 4,708,378 | 11/1987 | Ingenhoven | 70/257 X |
| 4,977,974 | 12/1990 | Brown | 70/226 |

FOREIGN PATENT DOCUMENTS 3101645  8/1982  Fed. Rep. of Germany ........ 70/225

Primary Examiner—Lloyd A. Gall
Attorney, Agent, or Firm—Cushman, Darby & Cushman

[57] ABSTRACT

An anti-theft device for a motor vehicle includes an elongate wheel lock bar slidably displaceable within a guide member, the guide member being fixedly securable to the floor board of a vehicle. When so secured and by providing suitable apertures in the floor board and fire wall of the vehicle, the wheel lock bar can be displaced between an inoperative position and an operative position in which the bar will inhibit the normal operation of a front wheel of the vehicle, thereby effectively immobilizing the vehicle. An electric motor is provided for displacing the wheel lock bar via a displacement shaft, operation of the motor being controlled by a control means in a manner that displacement of the wheel lock bar into its operative position will occur automatically upon the vehicle engine being switched off and the vehicle door being opened, whereas displacement into its inoperative position will require transmission of a coded signal to the control means.

15 Claims, 2 Drawing Sheets

ANTI-THEFT DEVICE FOR MOTOR VEHICLES

BACKGROUND AND SUMMARY OF THE INVENTION

THIS INVENTION relates to an anti-theft device for a motor vehicle.

The anti-theft device of the invention comprises a device that inhibits the normal operation of a wheel of a motor vehicle, particularly the wheel that is manipulated for steering of the vehicle, hereinafter merely being referred to as the "steered" wheel of a vehicle. It will be appreciated that the steered wheel of a vehicle is rotatable about its normal axis of rotation during movement of the vehicle, as well as about a vertical axis for steering purposes.

According to the invention there is provided an anti-theft device for a motor vehicle, which includes an elongate wheel lock bar, defining a longitudinal axis, securable to the body of a vehicle in a configuration in which it is displaceable between an inoperative position and at least one operative position in which the bar can inhibit normal operation of a steered wheel of the vehicle;

displacement means for displacing the wheel lock bar between its inoperative and operative positions, and holding the bar in these positions; and control means for controlling operation of the displacement means.

The elongate wheel lock bar may be securable to the floor board of a vehicle, with the said floor board and other vehicle body parts being adapted to accommodate the elongate wheel lock bar and its displacement between its inoperative and operative positions. Particularly, the wheel lock bar may be securable to the floor board of a vehicle, either on the interior side of the vehicle or on the underside of the vehicle. For the latter configuration, the vehicle chassis also can be utilised for securing the wheel lock bar to the body of the vehicle. For both possible modes of securing the wheel lock bar to the body of a vehicle, the floor board, the fire wall and other body parts of the vehicle may require suitable adaptation to permit the required displacement of the elongate wheel lock bar.

Further according to the invention, the anti-theft device may include a guide member within which the wheel lock bar is slidably displaceable for displacement along the line of its longitudinal axis between its inoperative and operative positions, the guide member being fixedly securable to the body of a vehicle to thereby provide for securing of the elongate wheel lock bar in its required displaceable mode to the body of a vehicle.

Still further, the elongate wheel lock bar, when secured to the body of a vehicle, may be displaceable from its inoperative position into one of two possible operative positions, one operative position being a position in which one end of the wheel lock bar bears against the tire of a steered wheel of a vehicle for inhibiting rotation of the said wheel and the other operative position being a position in which the steered wheel is turned about its vertical axis to the extent that the said end of the wheel lock bar is positioned adjacent the said wheel, blocking turning back of the said wheel. Clearly, neither of the operative positions need be absolute positions, these positions merely being determined by the exact disposition of the steered wheel of a vehicle when the anti-theft device is rendered operative.

The said end of the wheel lock bar that can bear against the tire of a steered wheel of a vehicle may include a formed head formation for bearing against the tire of the said steered wheel of a vehicle.

The displacement means of the anti-theft device may include a motor that can act on the wheel lock bar for displacing the said bar between its inoperative and operative positions. The motor may be a hydraulic or a pneumatic motor or, preferably, is an electric motor. For the latter configuration motor, connector means may be provided for electrically connecting the motor to the battery of a vehicle on which the device of the invention can be mounted, permitting the motor to be powered by the vehicle battery.

Still further, the displacement means may include a threaded displacement shaft rotatable by the motor about its longitudinal axis within a space provided therefor along the length of the wheel lock bar, the wheel lock bar having a threaded nut formation located within the said space, which is engaged by the threaded displacement shaft, so that by rotation of the said shaft, the wheel lock bar can be displaced along the line of its longitudinal axis between its inoperative and operative positions.

The control means may include an electric control circuit and electric components for controlling the operation of the displacement means for displacing the wheel lock bar. As such, the control means may include activating means for activating the operation of the displacement means for displacing the wheel lock bar from its inoperative position to an operative position, the activating means being operable for activating operation of the displacement means in response to the ignition circuit of the vehicle on which the anti-theft means is mounted, being switched off and the vehicle door having opened.

Still further, the control means may include activating means for activating reverse operation of the displacement means for displacing the wheel lock bar from an operative position to its inoperative position, the activating means having signal receiving means for receiving a coded signal being transmitted to it, and being operable in response to such a coded signal being received for activating reverse operation of the displacement means, the control means including further a portable signal transmitter for transmitting a required coded signal to the signal receiving means.

For the above configuration of the control means, the anti-theft device may include sensor means for sensing resistance to displacement of the wheel lock bar, and for deactivating the operation of the displacement means for as long as a predetermined degree of resistance to displacement is being sensed, permitting reactivation of the operation of the displacement means when said predetermined degree of resistance ceases to exist. The said sensor means may be incorporated as part of the displacement means for displacing the wheel lock bar, and includes switches for deactivating the displacement means while predetermined degrees of resistance to displacement is sensed.

Still further, the anti-theft device may include an, immobilizer means for immobilizing a vehicle on which the device is mounted in response to displacement of the wheel lock bar from its inoperative position being sensed. The immobilizer means may include cut-out means that will cut-out the vehicle engine while the wheel lock bar is displaced from its inoperative position.

The anti-theft device also may include a holding means for holding the wheel lock bar in its inoperative position, the holding means being operable in response to a vehicle ignition being switched off for releasing the wheel lock bar to permit its displacement to an operative position thereof. The holding means may be a solenoid operated lock having a locking member engaged with a formation defined by the wheel lock bar, for resisting displacement of the wheel lock bar until the vehicle ignition has been switched off. Clearly, both the immobilizer means and the holding means will serve as safety means to ensure that the wheel lock bar cannot be displaced into its operative position while a vehicle engine is running and the vehicle therefore may be in motion.

Both the displacement means and control means of the anti-theft device may be housed in a tamper proof housing, the housing having an opening therein for providing access to the displacement means to permit manual operation of the displacement means for displacing the wheel lock bar, the housing including a lockable blocking member for blocking said opening.

All the exposed mechanical components of the device of the invention may be of a tamper proof material such as of case hardened steel, or the like.

Further features of the invention are described in more detail hereinafter, with reference to an example of the invention illustrated by way of drawings.

BRIEF DESCRIPTION OF THE DRAWINGS

The invention is now described, by way of an example, with reference to the accompanying diagrammatic drawings, in which.

DETAILED DESCRIPTION OF THE PRESENTLY

PREFERRED EXEMPLARY EMBODIMENT

Figure 1:
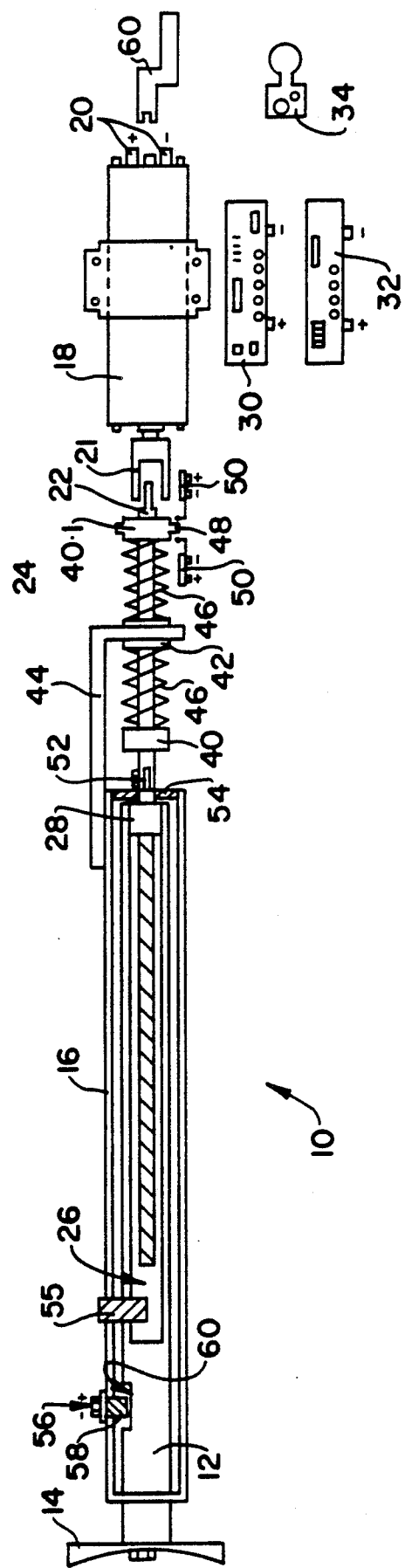
FIG. 1 shows a schematic, partially sectioned, side view of a anti-theft device for a motor vehicle, in accordance with the invention.

Referring initially to FIG. 1 of the drawings, an anti-theft device for a motor vehicle, in accordance with the invention, is designated generally by the reference numeral 10. The anti-theft device 10 includes an elongate wheel lock bar 12, which defines a longitudinal axis and which is slidably displaceable along the line of this longitudinal axis within a guide member 16. The wheel lock bar 12 defines a square cross-section, whereas the guide member 16 is in the form of a square tube permitting sliding displacement of the wheel lock bar therein along the length thereof. The free end of the wheel lock bar 12 is provided with a head formation 14, the head formation 14 being formed to bear against the tire of a vehicle wheel without causing any damage to the said tire or wheel.

In one particular operative configuration of the device 10, the guide member 16 is securable to the floor board of a vehicle, on the interior side of the vehicle, in a location in which the wheel lock bar can project through apertures in the floor board and fire wall of the vehicle, so that upon displacement of the wheel lock bar 12 within the guide member 16, the head formation 14 can be displaced into a position in which it inhibits normal operation of a front wheel of the vehicle, being the steered wheel of the vehicle. Particularly, the wheel lock bar 12 is displaceable between an inoperative position and any one of two operative positions, as is described in more detail hereafter.

The anti-theft device 10 includes further a displacement means for displacing the wheel lock bar between its inoperative and operative positions, the displacement means including an electric motor 18 that can be electrically powered by the battery of a vehicle on which the device is mounted, by connecting the said battery to contacts 20 provided on the motor 18.

The motor 18 has a rotatable output including a connector formation 21, which defines a slot within which the end of a displacement shaft 22 is slidably receivable for mechanical engagement between them, which will permit output rotation of the motor 18 to be transmitted to the shaft 22, while a limited degree of misalignment is accommodated and a limited degree of axial displacement of the displacement shaft 22 is also permitted. The shaft 22 extends, via a sensor arrangement 24, the operation of which is explained in more detail hereinafter, into an elongate channel formation 26 defined along the length of the wheel lock bar 12, the end region of the displacement shaft disposed within the said channel formation 26 being threaded and passing through a complementary nut formation 28, which is engaged with the displacement shaft 22 and which is secured to the wheel lock bar 12, by being welded or otherwise secured thereto.

It will thus be understood that by operation of the electric motor 18 and resulting rotation of the displacement shaft 22, which will remain axially stationary, the nut formation 28 will be displaced along the threaded region of the displacement shaft 22, thus providing for displacement of the wheel lock bar 12 along the line of its longitudinal axis and as guided by the guide member 16. For one direction of rotation of the displacement shaft 22, the wheel lock bar will be displaced from an inoperative position as shown in FIG. 1, to an operative position in which it extends further from the guide member 16, whereas reverse rotation of the displacement shaft will provide for reverse displacement of the wheel lock bar 12 back towards its inoperative position. It will be understood that the electric motor 18 may incorporate a gear box that will ensure a desired rate of displacement of the wheel lock bar 12.

The anti-theft device 10 includes still further control means including a control circuit 30 that will provide for control over the displacement of the wheel lock bar 12, the actual control circuitry not being shown in detail herein as this is greatly variable and those skilled in the art will be able to design suitable circuitry without undue problems and within the parameters hereinafter set out.

The control means includes activating means for activating the electric motor 18 in order to provide for rotation of the displacement shaft 22 in a direction which will provide for displacement of the wheel lock bar 12 from an inoperative position as shown to an operative position. The said activating means is responsive to both the vehicle ignition being switched off and a vehicle door having opened, suitable circuitry being provided to sense the above occurring, ensuring that displacement of the wheel lock bar 12 from its inoperative position cannot occur while a vehicle engine is still running and/or the vehicle is still in motion. Activation will occur automatically upon the above being sensed, thus ensuring that the anti-theft device is rendered operative without requiring any conscious action by a vehicle driver.

The control means includes further activating means for activating the electric motor for reverse rotation of the displacement shaft in order to again retract the wheel lock bar and thus provide for displacement from an operative position into its inoperative position. This activating means is responsive to a coded signal being received by a signal receiver 32 forming a part of the control means, the control means also including a portable signal transmitter 34 whereby a required coded signal can be transmitted to the signal receiver 32. Clearly, this will ensure that the anti-theft device is only rendered inoperative upon a conscious action by a vehicle driver, it being particularly provided that the said activating means for activating the motor for reverse rotation of the displacement shaft will only operate in response to the vehicle driver having entered his vehicle and closed his vehicle door, but before starting the vehicle engine. Once again, suitable sensor means will be provided as part of the control circuitry for sensing that the above has occurred.

Both the above activating means will continue to provide for operation of the electric motor 18 until a predetermined degree of resistance to displacement of the wheel lock bar 12 is sensed, which will cause the motor to switch off. This resistance to displacement of the wheel lock bar 12 is sensed by the sensor arrangement 24, the sensor arrangement 24 including two washer elements 40, 40.1 fixed on the displacement shaft 22 and a third washer element 42 slidably located on the displacement shaft 22 and being held in position by a bracket 44, that is secured to the guide member 16, and two springs 46 acting between the third washer element 42 and the respective outer washer elements 40. This arrangement provides for an equilibrium position of the two washer elements 40 when no excessive reaction force acts on the displacement shaft 22, which is the usual situation during displacement of this shaft between its inoperative and operative positions. The washer element 40.1 has a collar formation 48 projecting therefrom, the collar formation being disposed between two operating members of two micro switches 50, contact with either operating member of either micro switch 50 providing for the electric motor 18 to be deactivated until such contact is again broken.

When displacement in either direction of the wheel lock bar 12 is resisted, or completely inhibited, it will be understood that a reaction force will act on the displacement shaft 22 via the nut formation 28, providing for displacement of the shaft 22 against the force of one of the springs 46 with respect to the wheel lock bar 12, this displacement causing displacement of the washer element 40.1 until its collar formation 48 makes contact with the operating member of either micro switch 50, which will result in deactivation of the motor 18. This will occur both when the wheel lock bar reaches an operative position as described hereinafter and when the wheel lock bar reaches its inoperative position when it is fully retracted, also described hereinafter. Also, when resistance to displacement of the wheel lock bar ceases, the sensor arrangement will revert to its equilibrium position and further displacement in the same direction will occur, the direction of displacement only being reversed through the operation of either activating means, which will only occur in the situations as described above.

In the configuration of the anti-theft device as shown, the part of the displacement shaft 22 including the sensor arrangement 24 and the threaded part thereof are separated, the two parts being connected by a coupling 52 as shown. An end plate 54 restricts access into the guide member 16, whereas a stop member 55 ensures that the wheel lock bar 12 cannot be displaced to the extent that disengagement between the nut formation 28 and the displacement shaft 22 will occur. Furthermore, a solenoid operated locking mechanism 56 is mounted on the guide member 16, the locking mechanism 56 including a locking member 58 that can engage a recess formation 60 defined by the wheel lock bar 12, this locking mechanism 56 only permitting release of the wheel lock bar 12 when a vehicle's ignition has been switched off. This will ensure that displacement of the wheel lock bar 12 from its inoperative position cannot occur while a vehicle engine is still running, even if the circuitry of the control means is interfered with.

A further sensor (not shown) is mounted on the guide member 16 in a location in which it can sense displacement of the wheel lock bar 12 from its inoperative position, immediately resulting in the engine of a vehicle on which the device is mounted to be cut-out, thus providing an additional safety precaution that will not permit accidental operation of the device while a vehicle engine is still running and/or while a vehicle is still in motion. Clearly, the immobilizer effect provided by the cut out means will enhance the qualities of the anti-theft device and complement the locking mechanism 56.

The entire sensor arrangement 24 including the displacement shaft 22, the electric motor 18 and the control means may all be housed in an outer housing that is of a tamper proof material, it being particularly anticipated that at least all the exposed mechanical components of the anti-theft device 10 will be of case hardened steel or any other tamper proof material which will ensure that the mechanical operation of the device cannot be interfered with. The said housing including the guide member 16 will be particularly formed to permit securing of the complete device 10 in a suitable location on a vehicle, the mode of securing of the anti-theft device 10 again being such that the device will be mechanically secure and tampering therewith will not be permitted. The said housing referred to above may incorporate an opening near the end thereof where the motor 18 is located, the opening providing access to the motor 18 in order to permit manual rotation thereof by a crank 60, thus providing an override, which will permit displacement of the wheel lock bar 12 when required and when the control means is rendered ineffective, for example, when the power provided by a vehicle battery becomes insufficient. The said opening referred to will be lockable by a blocking member which includes a special lock which will have to be operated for its removal, to provide the access as described.

Figure 2:
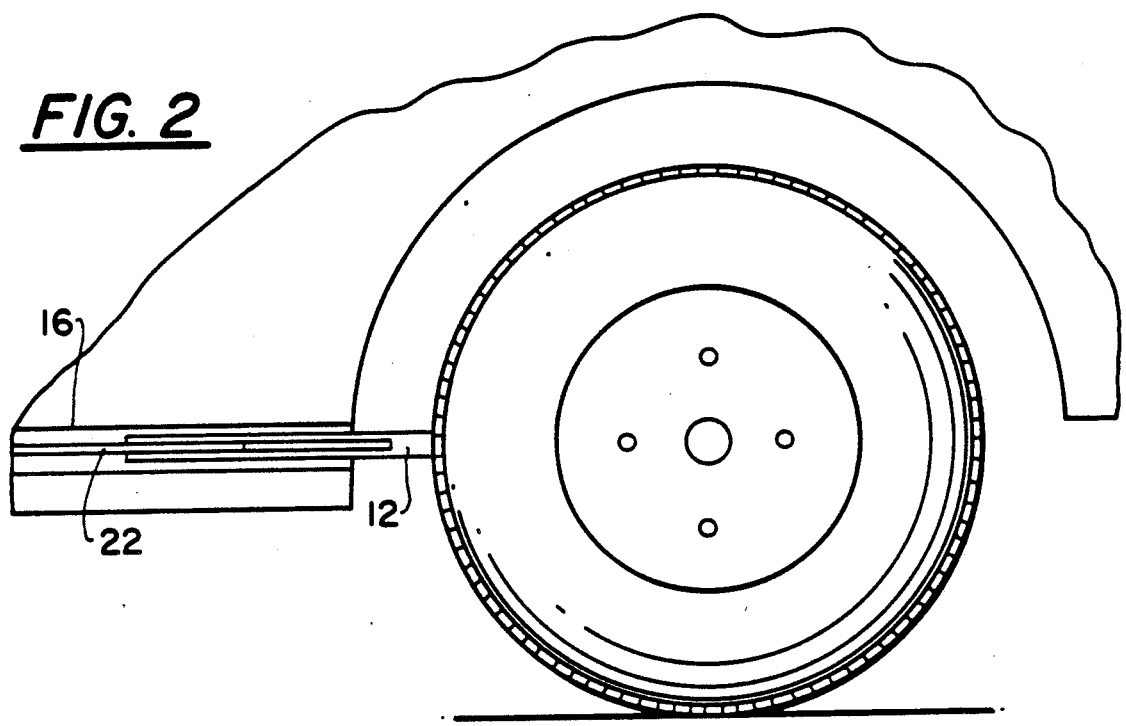
FIG. 2 shows schematically the anti-theft device of FIG. 1, in a first operative position thereof.
Figure 3:
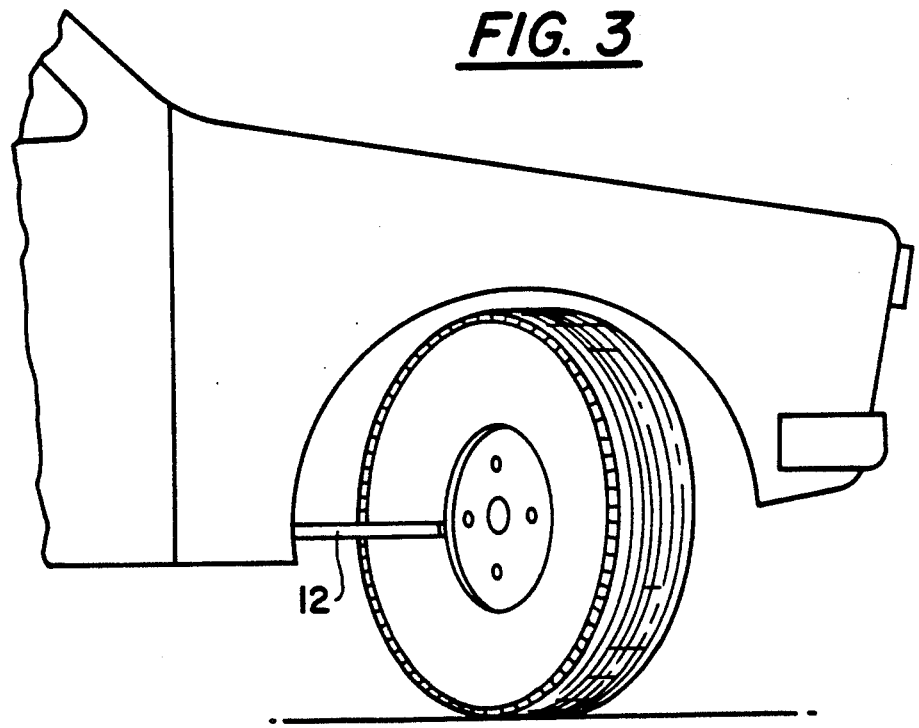
FIG. 3 shows schematically the anti-theft device of FIG. 1, in a second operative position thereof.

In use, and referring also to FIGS. 2 and 3 of the drawings, when mounted on a motor vehicle in the configuration as above described, when a vehicle is stopped, the ignition circuit of the vehicle is switched off and the vehicle door has been opened, the motor 18 will be activated causing displacement of the wheel lock bar 12 from its inoperative position until the head formation 14 bears against the tire of the steered wheel of the vehicle, inhibiting rotation thereof and thus immobilizing the vehicle (see FIG. 2). The motor 18 only will be deactivated when a predetermined reaction force acts on the displacement shaft 22 and if, for example, the vehicle tire is let down, or the steered wheel is turned about its vertical axis and the said reaction ceases, reactivation of the motor will occur providing for continued displacement of the wheel lock bar 12 until it again bears against the tire, as proposed above. If the steered wheel is turned sufficiently so that the tire is no longer in line with the head formation 14 of the wheel lock bar 12, displacement of the wheel lock bar will continue until a stop position is reached and in this position it will not be possible to turn back the wheel to its straight line position and, as such, the vehicle will again be effectively immobilized (see FIG. 3).

Only when a required coded signal is transmitted to the signal receiver 32 by the signal transmitter, will the motor 18 be activated for reverse operation and displacement of the wheel lock bar 12 back to its inoperative position, this displacement continuing until the inoperative position is reached and a reaction force again acts on the displacement shaft providing for operation of the sensor arrangement 24 and resulting in deactivation of the motor 18.

It is believed that the anti-theft device as is described above will be extremely effective to reduce vehicle theft, interference with the control means not being possible.

I claim:

1. An anti-theft device for a motor vehicle, which includes an elongate wheel lock bar, defining a longitudinal axis, securable to the body of a vehicle in a configuration in which it is displaceable between an inoperative position and two operative positions in which the bar can inhibit normal operation of a steered wheel of the vehicle one operative position being a position in which one end of the wheel lock bar bears against the tire of a steered wheel of a vehicle for inhibiting rotation of the said wheel and the other operative position being a position in which the steered wheel is turned about its vertical axis to the extent that the said end of the wheel lock bar is positioned adjacent the said wheel, blocking turning back of the said wheel;
    displacement means for displacing the wheel lock bar between its inoperative and operative positions and for holding the bar in these positions;
    control means for controlling operation of the displacement means; and
    sensor means for sensing resistance to displacement of the wheel lock bar in a first direction of displacement, for deactivating the operation of the displacement means for as long as a predetermined degree of resistance to displacement is being sensed, and for permitting reactivation of the operation of the displacement means for continuing displacement of the wheel lock bar in said first direction when said predetermined degree of resistance ceases to exist, said sensor means incorporated as part of the displacement means for displacing the wheel lock bar, and including switches for deactivating the displacement means while predetermined degrees of resistance to displacement is sensed.

2. An anti-theft device as claimed in claim 1, in which the elongate wheel lock bar is securable to the floor board of a vehicle with the said floor board and other vehicle body parts being adapted to accommodate the elongate wheel lock bar and its displacement between its inoperative and operative positions.

3. A anti-theft device as claimed in claim 1, which includes a guide member within which the wheel lock bar is slidably displaceable for displacement along the line of its longitudinal axis between its inoperative and operative positions, the guide member being fixedly securable to the body of a vehicle.

4. An anti-theft device as claimed in claim 1, in which the said end of the wheel lock bar includes a formed head formation for bearing against the tire of a steered wheel of a vehicle.

5. An anti-theft device as claimed in claim 1, in which the displacement means includes a motor that can act on the wheel lock bar for displacing the said bar between its inoperative and operative positions.

6. An anti-theft device as claimed in claim 5, in which the motor is an electric motor.

7. An anti-theft device as claimed in claim 6, in which the motor includes connector means for electrical connection to the battery of a vehicle on which the device is mounted, permitting the motor to be powered by the vehicle battery.

8. An anti-theft device as claimed in claim 5, in which the displacement means includes a threaded displacement shaft rotatable by the motor about its longitudinal axis within a space provided therefore along the length of the wheel lock bar, the wheel lock bar having a threaded nut formation located within the said space, which is engaged by the threaded displacement shaft so that by rotation of the said shaft, the wheel lock bar can be displaced along the line of its longitudinal axis between its inoperative and operative positions.

9. An anti-theft device as claimed in claim 1, in which the control means includes an electronic control circuit and electronic components for controlling the operation of the displacement means for displacing the wheel lock bar.

10. An anti-theft device as claimed in claim 9, in which the control means includes activating means for activating the operation of the displacement means for displacing the wheel lock bar from its inoperative position to an operative position, the activating means being operable for activating operation of the displacement means in response to the ignition circuit of the vehicle on which the anti-theft device is mounted, being switched off and the vehicle door having opened.

11. An anti-theft device as claimed in claim 10, in which the control means includes activating means for activating reverse operation of the displacement means for displacing the wheel lock bar from an operative position to its inoperative position, the activating means having signal receiving means for receiving a coded signal being transmitted to it and being operable in response to such a coded signal being received for activating reverse operation of the displacement means, the control means including further a portable signal transmitter for transmitting a required coded signal to the signal receiving means.

12. An anti-theft device as claimed in claim 1, which includes a immobilizer means for immobilizing a vehicle on which the device is mounted in response to displacement of the wheel lock bar from its inoperative position being sensed.

13. An anti-theft device as claimed in claim 12, in which the immobilizer means includes cut-out means that will cut-out the vehicle engine while the wheel lock bar is displaced from its inoperative position.

14. An anti-theft device as claimed in claim 1, which includes a holding means for holding the wheel lock bar in its inoperative position, the holding means being operable in response to a vehicle ignition being switched off for releasing the wheel lock bar to permit its displacement to an operative position thereof.

15. An anti-theft device as claimed in claim 14, in which the holding means is a solenoid operated lock having a locking member engaged with a formation defined by the wheel lock bar for resisting displacement of the wheel lock bar until the vehicle ignition has been switched off.

* * * * *